(12) United States Patent  
Yamato

(10) Patent No.: US 10,516,173 B2  
(45) Date of Patent: Dec. 24, 2019

(54) ALKALINE DRY BATTERY

(71) Applicant: Panasonic Intellectual Property Management Co., Ltd., Osaka (JP)

(72) Inventor: Kenji Yamato, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/769,332

(22) PCT Filed: Oct. 14, 2016

(86) PCT No.: PCT/JP2016/004580  
§ 371 (c)(1),  
(2) Date: Apr. 18, 2018

(87) PCT Pub. No.: WO2017/119018  
PCT Pub. Date: Jul. 13, 2017

(65) Prior Publication Data  
US 2018/0309138 A1    Oct. 25, 2018

(30) Foreign Application Priority Data

Jan. 8, 2016  (JP) .................... 2016-003018

(51) Int. Cl.  
*H01M 6/08* (2006.01)  
*H01M 4/50* (2010.01)  
(Continued)

(52) U.S. Cl.  
CPC ............ *H01M 6/08* (2013.01); *H01M 4/06* (2013.01); *H01M 4/24* (2013.01); *H01M 2/0225* (2013.01);  
(Continued)

(58) Field of Classification Search  
None  
See application file for complete search history.

(56) References Cited

U.S. PATENT DOCUMENTS

2009/0317711 A1    12/2009  Kato  
2013/0236775 A1*   9/2013  Nunome ............... H01M 2/02  
                                               429/185  
2018/0254493 A1    9/2018  Yoshii

FOREIGN PATENT DOCUMENTS

EP         3396756 A1      10/2018  
JP      2009-158257         7/2009  
(Continued)

OTHER PUBLICATIONS

Endo et al. JP 2015138668, machine translation (Year: 2015).*  
(Continued)

*Primary Examiner* — Wojciech Haske  
(74) *Attorney, Agent, or Firm* — McDermott Will & Emery LLP

(57) ABSTRACT

An alkaline dry battery includes a bottomed cylindrical battery case; a positive electrode packed in the battery case and including n hollow cylindrical pellets; a negative electrode disposed in a hollow portion of the pellets; a separator interposed between the positive electrode and the negative electrode; and an alkaline electrolytic solution. The positive electrode includes manganese dioxide and a conductive agent, n is an integer of 1 or more, and an average density of manganese dioxide of the positive electrode is 2.80 to 3.00 g/cm$^3$. The density $d_c$ of manganese dioxide in the center portion in the height direction of the positive electrode is 98% or less of an average value $d_e$ of density of manganese dioxide in each of both end portions.

8 Claims, 9 Drawing Sheets

(51) Int. Cl.
    *H01M 4/06*     (2006.01)
    *H01M 4/24*     (2006.01)
    *H01M 2/02*     (2006.01)
    *H01M 10/28*     (2006.01)

(52) U.S. Cl.
    CPC ............ *H01M 4/50* (2013.01); *H01M 10/283* (2013.01); *H01M 2300/0014* (2013.01)

(56) References Cited

FOREIGN PATENT DOCUMENTS

| | | | |
|---|---|---|---|
| JP | 2015138668 A | * | 7/2015 |
| WO | 2017/110023 A1 | | 6/2017 |

OTHER PUBLICATIONS

The Extended European Search Report dated Jan. 2, 2019 for the related European Patent Application No. 16883524.7.
International Search Report of PCT application No. PCT/JP2016/004580 dated Jan. 10, 2017.

* cited by examiner

ALKALINE DRY BATTERY

PRIORITY

This application is a U.S. National stage application of International Application PCT/JP2016/004580, with an international filing date of Oct. 14, 2016, which claims priority to Japanese Patent Application No. 2016-003018 filed on Jan. 8, 2016. The entire disclosures of International Application PCT/JP2016/004580 and Japanese Patent Application No. 2016-003018 are hereby incorporated herein by reference.

TECHNICAL FIELD

The present invention relates to an improvement of a positive electrode in an alkaline dry battery.

BACKGROUND ART

An alkaline dry battery (alkaline manganese dry battery) is widely used because it has a large capacity, and a large electric current can be taken out therefrom. A positive electrode of an alkaline dry battery is composed of a pellet including manganese dioxide powder as a positive electrode active material and graphite powder as a conductive agent. In view of increasing a capacity, it is considered to be advantageous to increase a density of manganese dioxide in the positive electrode. However, manganese dioxide expands at the time of discharging, so that the entire positive electrode expands.

Patent Literature (PTL) 1 proposes that a density of graphite in a positive electrode material is adjusted in order to suppress increase in a dimension of an outer diameter of a battery after discharging while a high capacity is secured. In PTL 1, stress caused by expansion of manganese dioxide is allowed to diffuse by adjusting the density of graphite to a specific range.

CITATION LIST

Patent Literature

PTL 1: Japanese Patent Unexamined Publication No. 2009-158257

SUMMARY OF THE INVENTION

In an alkaline dry battery, when a density of manganese dioxide in a positive electrode is increased in view of increasing a capacity, expansion of the positive electrode at the time of discharging is remarkable. In the vicinity of the center in the height direction of the battery (or a region other than the both end portions in the height direction), the expansion of the positive electrode becomes particularly remarkable, and an outer diameter of the battery may be increased.

An object of the present disclosure is to suppress an increase in an outer diameter of a battery while a high capacity is secured in an alkaline dry battery.

One aspect of the present disclosure relates to an alkaline dry battery including: a bottomed cylindrical battery case; a positive electrode packed in the battery case and including n pieces of hollow cylindrical pellets; a negative electrode disposed in a hollow portion of the pellets; a separator interposed between the positive electrode and the negative electrode; and an alkaline electrolytic solution. The positive electrode includes manganese dioxide and a conductive agent, and n is an integer of 1 or more. An average density of manganese dioxide in the positive electrode is 2.80 to 3.00 g/cm$^3$. A density $d_c$ of manganese dioxide in a center portion in a height direction of the positive electrode is 98% or less of an average value $d_e$ of densities of manganese dioxide in both end portions in the height direction of the positive electrode.

Another aspect of the present disclosure relates to an alkaline dry battery including: a bottomed cylindrical battery case; a positive electrode packed in the battery case and including n pieces of hollow cylindrical pellets; a negative electrode disposed in a hollow portion of the pellets; a separator interposed between the positive electrode and the negative electrode; and an alkaline electrolytic solution. The positive electrode includes manganese dioxide and a conductive agent, and n is an integer of 1 or more. An average density of manganese dioxide in the positive electrode is 2.80 to 3.00 g/cm$^3$. Surface hardness $H_c$ of the positive electrode in a center portion in a height direction of the positive electrode is 48% or less of an average value $H_e$ of surface hardnesses of the positive electrode in both end portions in the height direction of the positive electrode.

An alkaline dry battery according to the present disclosure can secure a high capacity, and, at the same time, can suppress an increase in an outer diameter of the battery.

DESCRIPTION OF EMBODIMENTS

[Alkaline Dry Battery]

Figure 1:
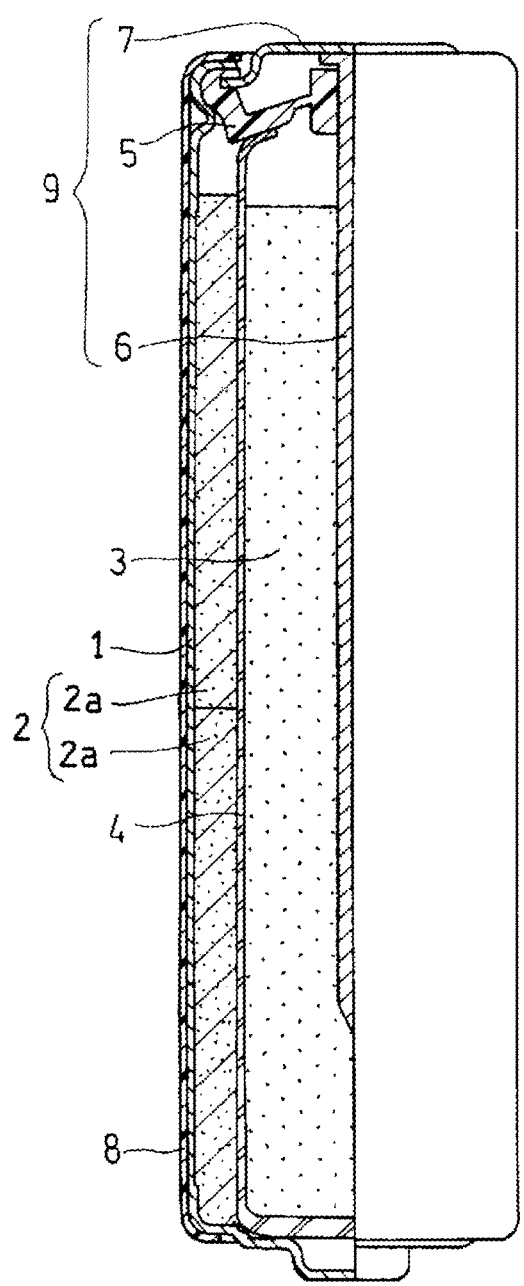
FIG. 1 is a longitudinal sectional view schematically showing an alkaline dry battery in accordance with a first exemplary embodiment of the present invention.

An alkaline dry battery in accordance with the present disclosure includes a bottomed cylindrical battery case, a positive electrode packed in the battery case and composed of or including n pieces of hollow cylindrical pellets, a negative electrode disposed in a hollow portion of the pellets, a separator interposed between the positive electrode and the negative electrode, and an alkaline electrolytic solution. The positive electrode includes manganese dioxide and a conductive agent, and n is an integer of 1 or more. An average density of manganese dioxide is 2.80 to 3.00 g/cm$^3$. The positive electrode satisfies the following (1) and/or (2).

(1) A density $d_c$ of manganese dioxide in a center portion in a height direction of the positive electrode is 98% or less of an average value $d_e$ of density of manganese dioxide in each of both end portions in the height direction of the positive electrode.

(2) Surface hardness $H_c$ of the positive electrode in the center portion in the height direction of the positive electrode is 48% or less of an average value $H_e$ of surface hardness of the positive electrode in each of both end portions in the height direction of the positive electrode.

In order to increase a capacity of an alkaline dry battery, in general, it is effective to increase the density of manganese dioxide as a positive electrode active material in the positive electrode. However, when the density of manganese dioxide in the positive electrode is increased, expansion of the positive electrode at the time of discharging is remarkable, and the outer diameter of the battery is increased. Expansion of the positive electrode is particularly remarkable in the center portion in the height direction of the battery. This is because, in both end portions of the battery, a restraining force to deformation toward the outer peripheral direction of the battery case occurs by a can bottom and sealing, but the restraining force is reduced toward the center portion of the battery, so that the battery case is easily deformed toward the outer peripheral direction. When the outer diameter of the battery is increased, the battery is jammed in a battery holder or a battery box of a device or the battery is not taken out.

As mentioned above, the present disclosure relates to an alkaline dry battery in which the average density of manganese dioxide in the positive electrode is high such as 2.80 to 3.00 g/cm$^3$. In general, such an alkaline dry battery has a high capacity, but expansion of the positive electrode is easily increased. However, in the present disclosure, the density $d_c$ of manganese dioxide in the center portion and the average value $d_e$ of density of manganese dioxide in both end portions in the height direction of the positive electrode are set as in the above-mentioned (1). Consequently, even when the expansion of the positive electrode is large in the center portion in the height direction due to the density difference, a stress caused by the expansion can be absorbed. Furthermore, in the present disclosure, the surface hardness $H_c$ of the positive electrode in the center portion and the average value $H_e$ of surface hardness of the positive electrode in the both end portions in the height direction of the positive electrode are set as in the above-mentioned (2). In the positive electrode, the surface hardness in a region having a high density of manganese dioxide tends to be increased. Therefore, due to the difference of the surface hardness between the center portion and both end portions in the height direction of the positive electrode, even when the positive electrode expands in the center portion, a stress caused by the expansion can be absorbed.

Note here that when a positive electrode includes a plurality of pellets, the pellets are packed in a battery case without forming gaps between the pellets intentionally. More specifically, the pellets are packed in a battery case such that the end surfaces facing each other of the adjacent pellets are brought into contact with each other in the battery.

In this way, in the present disclosure, by making a difference in the distribution states of the density of manganese dioxide and/or the surface hardness, although the battery has a high capacity, increase in the outer diameter of the positive electrode can be suppressed. The positive electrode is only required to satisfy any one of (1) and (2) mentioned above, and may satisfy both (1) and (2).

Hereinafter, a configuration of an alkaline dry battery, measurement procedure of surface hardness in pellets, and calculation procedure of the density of manganese dioxide in accordance with the present disclosure are described with reference to drawings. Note here that the present invention is not limited to the following exemplary embodiments. Furthermore, any appropriate modifications can be carried out in a range of the scope in which the advantageous effect of the present invention is exhibited. Furthermore, the exemplary embodiments may be combined with the other exemplary embodiments.

Figure 2:
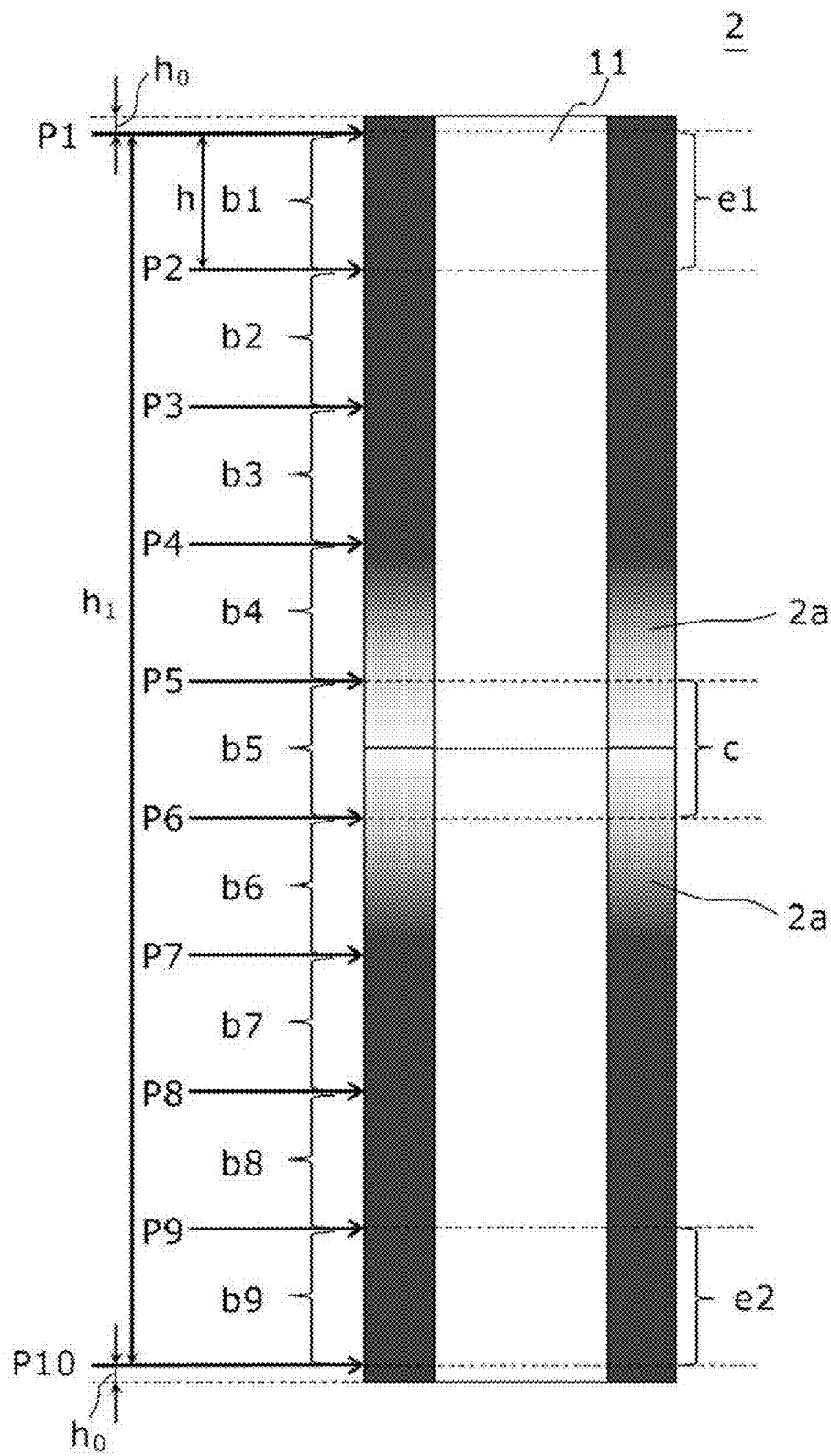
FIG. 2 is a schematic longitudinal sectional view schematically showing a positive electrode included in the alkaline dry battery of FIG. 1.

FIG. 1 is a front view showing an alkaline dry battery (first exemplary embodiment) in accordance with the present invention in which a lateral half is shown in a sectional view. FIG. 2 is a schematic longitudinal sectional view schematically showing positive electrode 2 included in the alkaline dry battery of FIG. 1.

As shown in FIGS. 1 and 2, the alkaline dry battery includes hollow cylindrical positive electrode 2, negative electrode 3 disposed in a hollow portion of positive electrode 2, separator 4 interposed between positive electrode 2 and negative electrode 3, and an alkaline electrolytic solution (not shown). These are housed in bottomed cylindrical battery case 1 serving as a positive terminal. Positive electrode 2 is packed into battery case 1. Gelled negative electrode 3 is packed into the hollow portion of positive electrode 2 via separator 4. In the example shown in the drawings, positive electrode 2 is composed of or containing a stack including two hollow cylindrical pellets 2a having hollow portion 11. As shown in FIG. 2, two pellets 2a are produced so as to have substantially the same size (or height).

Separator 4 has a bottomed cylindrical shape. Separator 4 is disposed on the inner surface of the hollow portion of positive electrode 2, separates positive electrode 2 from negative electrode 3, and separates negative electrode 3 from battery case 1. Positive electrode 2 includes manganese dioxide and a conductive agent. Negative electrode 3 usually includes an alkaline electrolytic solution and a gelling agent, in addition to a negative electrode active material containing zinc.

An opening of battery case 1 is sealed by sealing unit 9. Sealing unit 9 includes gasket 5, negative electrode terminal plate 7 that serves as a negative electrode terminal, and negative electrode current collector 6. Negative electrode current collector 6 is inserted into negative electrode 3. Negative electrode current collector 6 has a nail-shape having a head portion and a body portion, and the body portion is inserted into a through-hole shaped in a center cylinder portion of gasket 5, and the head portion of negative electrode current collector 6 is welded to a flat part of the center portion of negative electrode terminal plate 7. An opening end of battery case 1 is crimped to a flange portion of a circumference of negative electrode terminal plate 7 via the outer peripheral end of gasket 5. The outer surface of battery case 1 is covered with external label 8.

Hereinafter, measurement methods of surface hardness distribution and density distribution in the height direction of the positive electrode are specifically described.

As shown in FIG. 2, positions at height $h_0$ from the upper end surface and the lower end surface of positive electrode 2 are represented by P1 and P10, respectively. A height (or distance) $h_1$ from P1 to P10 is sectioned at positions P2 to P9 from a P1 side to a P10 side and divided into nine equal sections of blocks b1 to b9 each having height h. Note here that the height $h_0$ can be 0.5 to 1 mm. The positive terminal of the battery is positioned at a lower end surface side of positive electrode 2.

Figure 3:
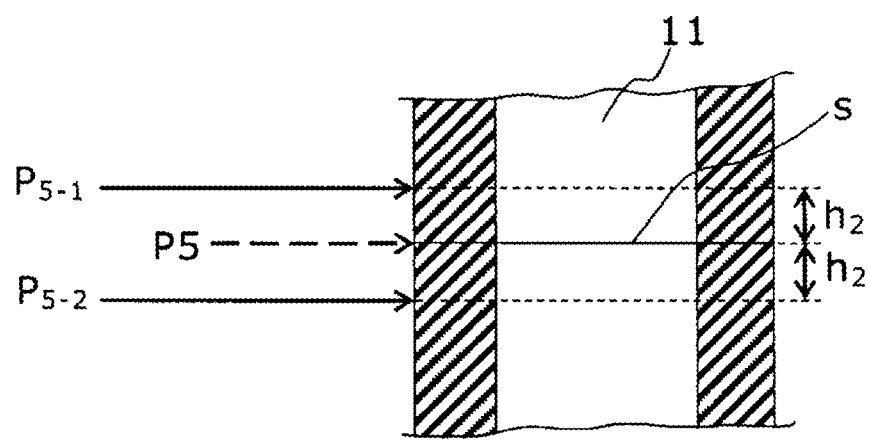
FIG. 3 is a schematic longitudinal sectional view to illustrate an actual position for measuring surface hardness when a measurement position of surface hardness corresponds to an interface between pellets.

The surface hardness is measured at each position from P1 to P10. The surface hardness $H_{e1}$ and $H_{e2}$ in both end portions e1 and e2 of positive electrode 2 are surface hardness H1 and H10 measured at the positions P1 and P10, respectively. Then, by averaging the surface hardnesses $H_{e1}$ and $H_{e2}$, an average value $H_e$ of surface hardness in both end portions of the positive electrode can be obtained. Furthermore, the surface hardness $H_c$ in the center portion c in the height direction of positive electrode 2 can be obtained by measuring and averaging surface hardnesses H5 and H6 at the both ends P5 and P6 in the height direction of block b5 positioned in the center portion c, respectively. Note here that the surface hardness of positive electrode 2 can be measured for a cylindrical positive electrode 2 which is taken out from a battery, then washed and dried. Measurement positions of the surface hardness can be any positions (points) on the circumferential surface of positive electrode 2 in each of P1 to P10 in the height direction of positive electrode 2. However, for example, as shown in FIG. 3, when the position at which the surface hardness is measured (P5 in an example shown in the drawing) corresponds to an interface between adjacent pellets, the surface hardness is measured at two points (positions $P_{5-1}$ and $P_{5-2}$) that are displaced slightly (height of $h_2$) from the interface toward the upper side and lower side in the height direction, the average value of these values may be the surface hardness in the interface section (P5). A distance (height $h_2$) between the actual measurement positions of surface hardness and the interface is, for example, 0.5 to 1 mm.

Note here that the surface hardness in the present specification is, for example, Vickers hardness (HV), and can be measured according to JIS Z2244. The surface hardness can be measured under conditions of, for example, a test force of 0.5 to 5 N, and a holding time of 10 to 20 seconds although depending on the density of manganese dioxide of a measurement sample. Furthermore, the surface hardness is not particularly limited to the surface hardness, which is measured by such a method. For example, surface hardness obtained from a displacement amount at the time when a minute load is applied using a compression test, may be employed.

The density of manganese dioxide in positive electrode 2 can be obtained from the surface hardness for each of blocks b1 to b9. In order to accurately calculate the density of manganese dioxide, the surface hardness values measured in both end portions of each block are averaged, and the density of manganese dioxide is calculated using the average value. The surface hardness value to be used for calculation of the density of manganese dioxide can be obtained specifically as follows. In block b5 positioned in the center portion of positive electrode 2, the average value of surface hardnesses H5 and H6 (surface hardness $H_c$) is used for calculation of the density (ρ5) of manganese dioxide of block b5. Also for each block of the blocks b2 to b4 and b6 to b8, an average value of surface hardness calculated according to the case of block b5 can be used for calculation of the density of manganese dioxide (each of ρ2 to ρ4 and ρ6 to ρ8). For the both end portions of positive electrode 2, average value $H_{b1}$ of the surface hardnesses H1 and H2 measured at both ends P1 and P2 in the height direction of block b1 positioned in the upper end portion e1 of positive electrode 2 is calculated, and average value $H_{b9}$ of the surface hardnesses H9 and H10 measured at both ends P9 and P10 in the height direction of block b9 positioned in the lower end portion e2 is calculated. Then, the average value of $H_{b1}$ and $H_{b9}$ is used for calculation of density of manganese dioxide in both end portions.

Figure 9:
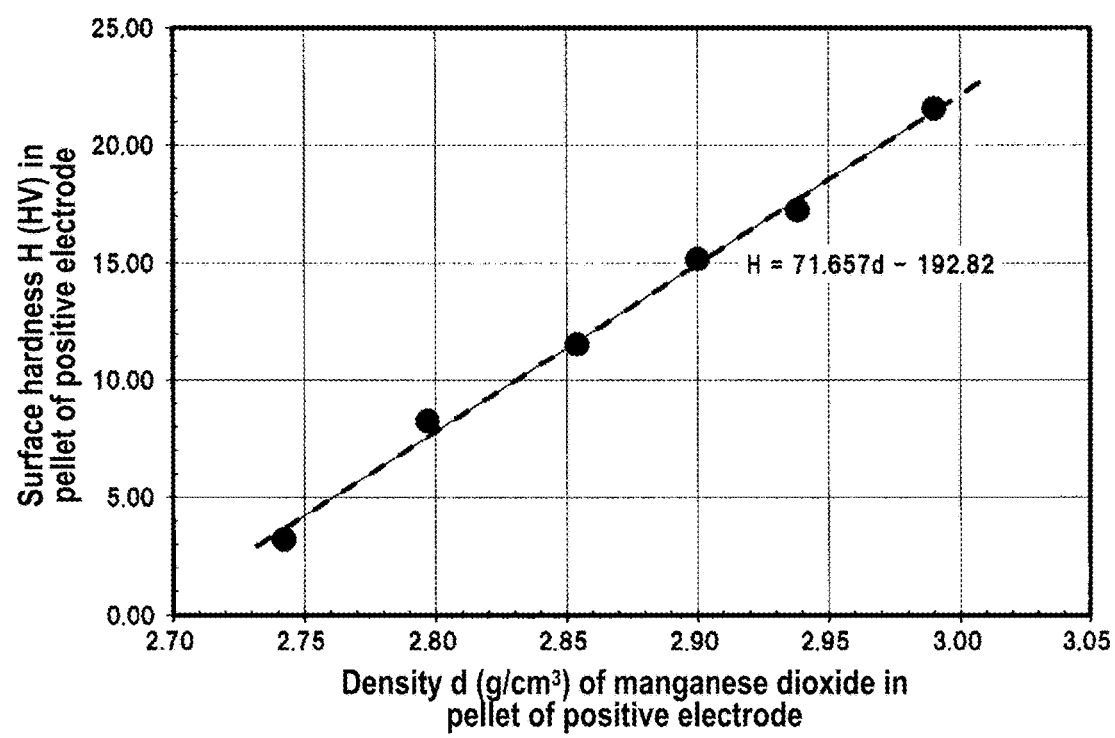
FIG. 9 is a graph showing one example of a correlation between surface hardness and a density of manganese dioxide in pellets of the positive electrode.

Hereinafter, a specific procedure of calculating a density of manganese dioxide from an average value of surface hardness is described As mentioned above, the surface hardness tends to be high in a region whose density of manganese dioxide is high. Accordingly, the surface hardness of a pellet in each block and the density of manganese dioxide in each block have a linear correlation. FIG. 9 shows a correlation between the surface hardness H and the density d of manganese dioxide in a pellet of a positive electrode.

The graph of FIG. 9 plots the relation between the surface hardness and the density of manganese dioxide measured for a plurality of sample pellets. The plurality of sample pellets are produced using a positive electrode material mixture having a predetermined raw material composition, while the filling amount of the positive electrode material mixture and/or the compression conditions are changed. In order to make a density in each sample pellet uniform, a sample pellet having a small volume (specifically, a cylindrical pellet having a height of 3.00 mm, outer diameter of 13.60 mm, and inner diameter of 8.89 mm) is produced. The density of manganese dioxide can be obtained by culculating a mass of manganese dioxide included in the pellet from the mass of the sample pellet and composition of the raw material, and dividing the mass by a volume of the pellet. As the positive electrode material mixture, granule including manganese dioxide powder (purity of manganese dioxide: 92%), graphite powder, a binder, and a predetermined amount of electrolytic solution was used. Herein, the mass ratio of the manganese dioxide powder and the graphite powder is 95:5, the binder is used at a rate of 0.2% by mass with respect to the manganese dioxide powder.

An approximate line of a plot in FIG. 9 is represented by a formula (1): H=71.657d−192.82 (in the formula, H represents surface hardness, and d represents a density of manganese dioxide). A density of manganese dioxide of each block or an average value of densities of manganese dioxide in both end portions can be obtained from an average value of surface hardness in each block or both end portions, using formula (1). More specifically, the density of manganese dioxide of each block can be obtained as the density d by substituting the average value of the surface hardness of the block into surface hardness H of the formula (1). For example, a density ρ5 ($d_c$) of manganese dioxide in block b5 in the center portion can be obtained as the density d by substituting the surface hardness $H_c$ into H of the formula (1). An average value of densities $d_e$ of manganese dioxide in both end portions can be obtained as the density d by substituting the average value $H_e$ of the surface hardness of the blocks at both ends into surface hardness H of formula (1).

A relational formula between the surface hardness and the density of manganese dioxide varies depending on raw material compositions of pellets. However, when the relation expression of the positive electrode of each battery is obtained according to the above-mentioned procedure, the density of manganese dioxide can be uniquely obtained from the surface hardness as in the formula (1).

The average density of manganese dioxide in a pellet can be obtained by dividing a mass of manganese dioxide included in the pellet by a volume of the pellet. A mass of manganese dioxide contained in the pellet can be calculated by taking the pellet from the battery, sufficiently dissolving the pellet in acid, then removing insoluble parts and collecting a solution, measuring the content of Mn contained in the solution by high-frequency Inductively Coupled Plasma-Optical Emission Spectrometry (ICP Optical Emission Spectrometry), and converting the content into a $MnO_2$ amount. The volume of pellet can be calculated from, for example, measured outer diameter, inner diameter, and height of each pellet in the X-ray image of the battery.

The volume of the pellet changes by immersing the pellet in an alkaline electrolytic solution, or discharging the battery. Therefore, the average density of manganese dioxide of n pellets may be obtained with respect to, for example, an alkaline dry battery in the initial state. Note here that the alkaline dry battery in the initial state is, for example, an alkaline dry battery after assembly of a battery (or after aging the assembled battery) and before first discharging.

In the present invention, the density $d_c$ ($\rho 5$) of manganese dioxide in the center portion c (block b5) in the height direction of the positive electrode is set to 98% or less of the average value of densities $d_e$ (the average value of $\rho 1$ and $\rho 9$) of manganese dioxide in both end portions e1 and e2 (blocks b1 and b9). Alternatively, the surface hardness $H_c$ (the average value of H5 and H6) in the center portion c (block b5) is set to 48% or less of the average value of surface hardness $H_e$ (the average value of H1 and H10) of both end portions (P1 and P10). This can suppress expansion in the center portion of the positive electrode, and can suppress the increase in the outer diameter of the battery.

In order to achieve the above-mentioned relation between the density of manganese dioxide and the surface hardness in the center portion and both end portions in the height direction of the positive electrode, it is preferable that a distribution state of the density of manganese dioxide of pellets is made nonuniform. FIG. 2 schematically shows a distribution state of the densities of manganese dioxide in pellets 2a by lightness and darkness in color. Each of pellets 2a has a darker color (that is, a higher density of manganese dioxide) at one end portion side in the height direction (in the cylindrical axial direction), and a lighter color (that is, a lower density of manganese dioxide) at another end portion side. When two pellets 2a are disposed such that the end portions at a side having a low density of manganese dioxide are brought into contact with each other, the density of manganese dioxide is higher in both end portions e1 and e2 sides in the height direction of the positive electrode, and the density of manganese dioxide is lower in the center portion c. Furthermore, the surface hardness is higher at both end portions e1 and e2 sides, and the surface hardness is lower in the center portion c.

Figure 4:
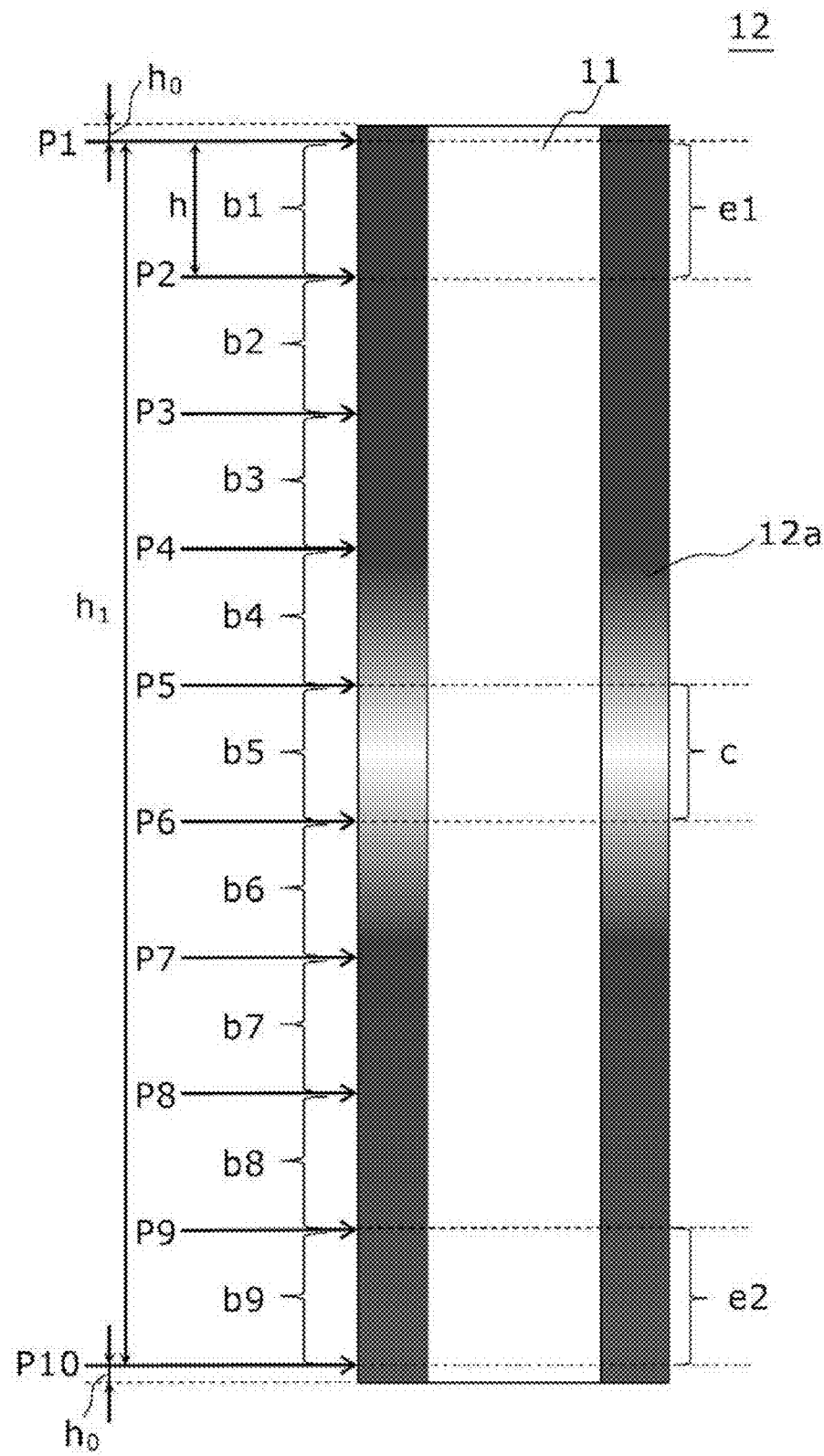
FIG. 4 is a schematic longitudinal sectional view schematically showing a positive electrode included in an alkaline dry battery in accordance with a second exemplary embodiment of the present invention.

FIG. 4 is a schematic longitudinal sectional view schematically showing a positive electrode included in an alkaline dry battery in accordance with a second exemplary embodiment of the present invention. FIG. 4 is the same as FIG. 2 except that the number of pellets constituting positive electrode 12 and the distribution state of the densities of manganese dioxide in pellets are different.

In FIG. 4, positive electrode 12 is composed of or including one pellet 12a (n=1). Pellet 12a has a hollow cylindrical shape having hollow portion 11. Also in FIG. 4, the density distribution of manganese dioxide in pellet 12a is shown in lightness and darkness in color. Pellet 12a has a lighter color (that is, a lower density of manganese dioxide) at a center portion c side having height h, and a darker color (that is, a higher density of manganese dioxide) at both end portions e1 and e2 sides.

Figure 5:
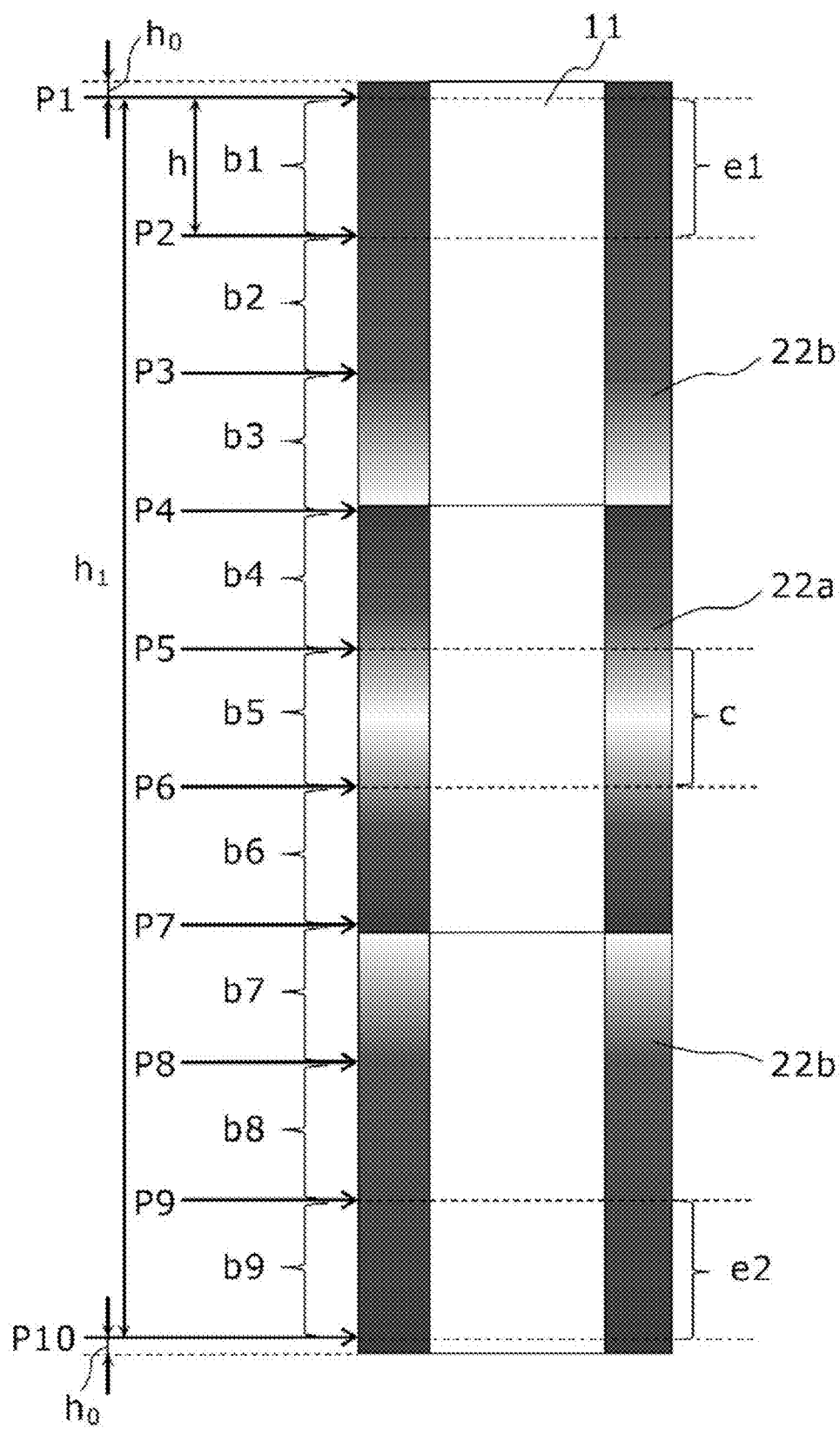
FIG. 5 is a schematic longitudinal sectional view schematically showing a positive electrode included in an alkaline dry battery in accordance with a third exemplary embodiment of the present invention.

FIG. 5 is a schematic longitudinal sectional view schematically showing a positive electrode included in an alkaline dry battery in accordance with a third exemplary embodiment of the present invention. FIG. 5 is the same as FIG. 2 except that the number of pellets constituting positive electrode 22 and the distribution state of densities of manganese dioxide in each pellet are different.

In FIG. 5, positive electrode 22 is composed of or containing a stack including three pellets in total, which include hollow cylindrical pellet 22a having hollow portion 11 and two pellets 22b sandwiching pellet 22a. Pellet 22b has also a hollow cylindrical shape having hollow portion 11. Pellet 22a positioned in the center in positive electrode 22 has a lighter color (a lower density of manganese dioxide) in the central side in the height direction (axial direction of the cylindrical shape), and has darker colors (higher densities of manganese dioxide) at both end sides. Two pellets 22b sandwiching pellet 22a have a darker color (a higher density of manganese dioxide) at one end portion side, and have a lighter color (a lower density of manganese dioxide) at another end portion side. Therefore, two pellets 22b are arranged such that end surfaces at the side having a lower density of manganese dioxide are brought into contact with the end surfaces of pellet 22a, respectively. Thus, the density of manganese dioxide is made lower in the center portion c in the height direction of the positive electrode, and the density of manganese dioxide is made higher in both end portions e1 and e2. Furthermore, each pellet 22a side of pellet 22b includes a region whose density of manganese dioxide is lower, but in this region, stress by expansion of the positive electrode can be relieved.

Figure 6:
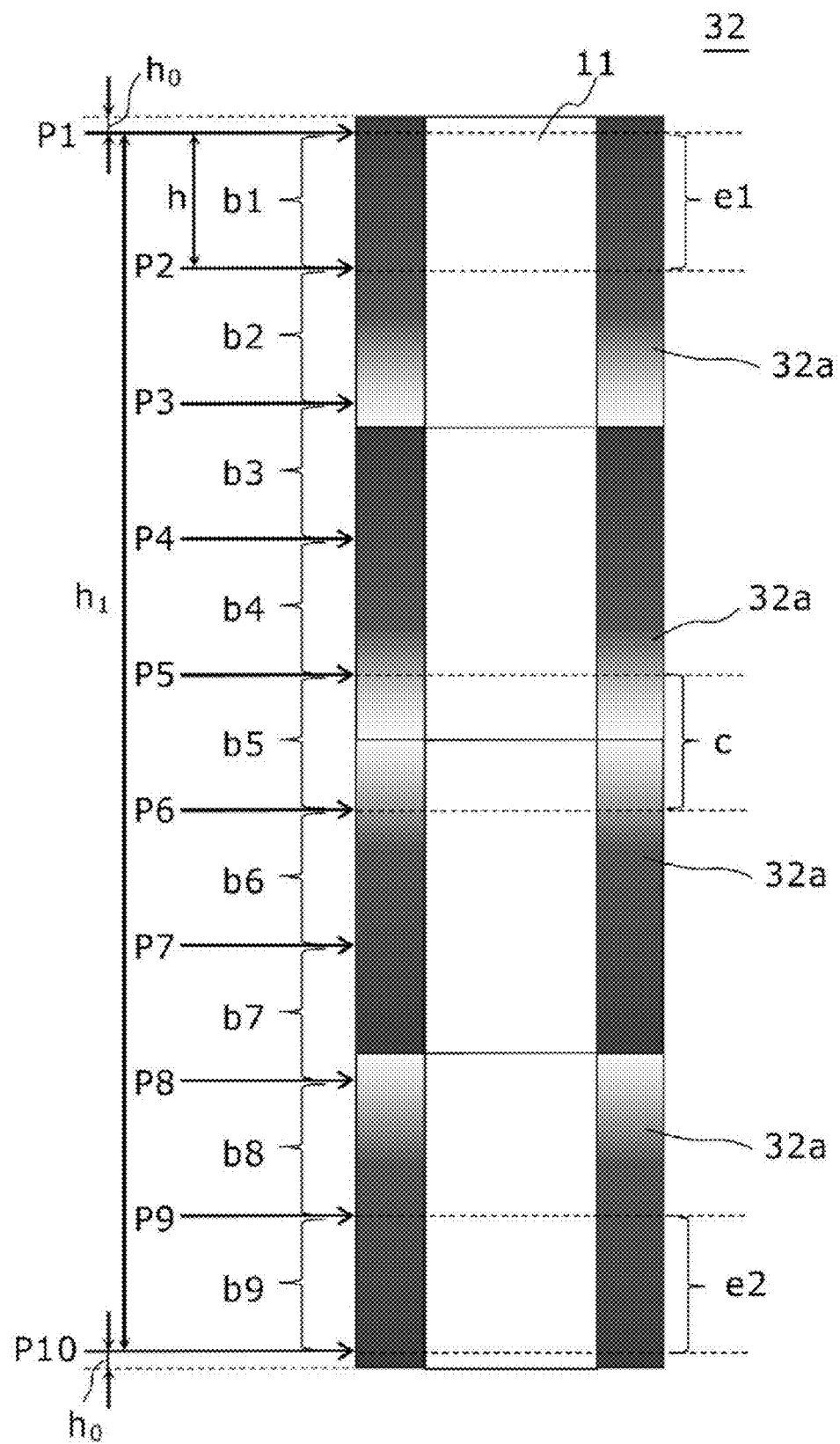
FIG. 6 is a schematic longitudinal sectional view schematically showing a positive electrode included in an alkaline dry battery in accordance with a fourth exemplary embodiment of the present invention.

FIG. 6 is a schematic longitudinal sectional view schematically showing a positive electrode included in an alkaline dry battery in accordance with a fourth exemplary embodiment of the present invention. FIG. 6 is the same as FIG. 2 except that the number of pellets constituting positive electrode 32 and the distribution state of the densities of manganese dioxide in positive electrode 32 are different.

In FIG. 6, positive electrode 32 is composed of or containing a stack including four pellets 32a in total (n=4). All pellets 32a have a hollow cylindrical shape having hollow portion 11. Each pellet 32a has a darker color (a higher density of manganese dioxide) at one end portion side, and a lighter color (a lower density of manganese dioxide) at another end portion side. Four pellets 32a are vertically arranged in the longitudinal direction such that end surfaces of the pellets in the height direction (axial direction of the cylindrical shape) are brought into contact with each other so as to form positive electrode 32. Two pellets 32a positioned in the central side in the height direction of positive electrode 32 are disposed such that end surfaces at a lighter-color side (at a side at which the density of manganese dioxide is lower) are brought into contact with each other. An interface between two pellets 32a is a center in the height direction of positive electrode 32. Two pellets 32a positioned at the end portion sides in the height direction of positive electrode 32 are disposed such that each of the end surface at a lighter-color side (at a side at which the density of manganese dioxide is lower) is brought into contact with each of the end surfaces at a darker-color side (at a side at which the density of manganese dioxide is higher) of pellets 32a positioned in the central side. When four pellets are arranged in this way, the density of manganese dioxide can be made lower in the center portion c in the height direction of positive electrode 32, and the density of manganese dioxide can be made higher in both end portions e1 and e2. Furthermore, there is a region whose density of manganese dioxide is low in the central portion side of pellets 32a positioned at the both end portion sides of the positive electrode. Therefore, also in this region, stress due to expansion of the positive electrode can be relieved.

Hereinafter, the detail of an alkaline dry battery is described.

Positive Electrode

A positive electrode is composed of or containing n hollow cylindrical pellets and is packed in a bottomed cylindrical battery case. The positive electrode includes manganese dioxide as a positive electrode active material. In the present invention, in n pellets included in the positive electrode, the average density of manganese dioxide is 2.80 to 3.00 g/cm³, and may be 2.90 to 3.00 g/cm³. Even in such a high density, according to the present invention, when the density of manganese dioxide (and/or the surface hardness) in the center portion in the height direction of the positive electrode is a predetermined rate or less with respect to the density of manganese dioxide (and/or the surface hardness) in both end portions, expansion of the positive electrode is suppressed, and increase in an outer diameter of the battery can be suppressed.

"n" is an integer of 1 or more, preferably an integer of 1 to 8, and more preferably an integer of 1 to 6. When n is in such a range, the distribution of the density of manganese dioxide or surface hardness can be easily adjusted.

The density $d_c$ of manganese dioxide in the center portion in the height direction of the positive electrode is 98% or less, and may be 96% or less of an average value of densities $d_e$ of manganese dioxide in the both end portions. In view of suppressing cracking and splitting of pellets during molding, the density $d_c$ of manganese dioxide is preferably 75% or more, and may be 80% or more of the average value of densities $d_e$ of manganese dioxide. The upper limit and lower limit values thereof can be combined arbitrarily. The density $d_c$ of manganese dioxide may be 75 to 98%, 80 to 98% or 75 to 96% of the average value of densities $d_e$ of manganese dioxide.

The surface hardness $H_c$ of the positive electrode in the center portion in the height direction of the positive electrode is preferably 48% or less, and may be 36% or less of the average value of surface hardness $H_e$ of the positive electrode in both end portions in the height direction of the positive electrode. In view of suppressing cracking and splitting of a pellet during molding, the surface hardness $H_c$ is preferably 7% or more, and may be 8% or more of the average value of surface hardness $H_e$. The upper limit and lower limit values thereof can be combined arbitrarily. The surface hardness $H_c$ may be 7 to 48%, or 8 to 48% of the average value of surface hardness $H_e$.

When the density $d_c$ of manganese dioxide is beyond 98% of $d_e$, or the surface hardness $H_c$ is beyond 48% of $H_e$, expansion in the center portion of the positive electrode cannot sufficiently be suppressed.

In the positive electrode, in at least the center portion, the density of manganese dioxide and/or the surface hardness may be in the above-mentioned range. For example, the density of manganese dioxide and/or the surface hardness may be reduced on average or gradually from both end portion sides toward a center portion side, or may be partially increased. Furthermore, in a region other than the center portion and the both end portions, the density of manganese dioxide (and/or the surface hardness) may be lower than 98% or less (and/or 48% or less of surface hardness) of the density of manganese dioxide in the both end portions. In this case, also in this region, stress caused by expansion of the positive electrode can be relieved.

In order to change the distribution state of the density of manganese dioxide and/or the surface hardness in the positive electrode, it is preferable to use a pellet in which the distribution state of the density of manganese dioxide and/or the surface hardness is changed. These distribution states of the pellets can be changed by appropriately adjusting the conditions in producing pellets.

Figure 7:
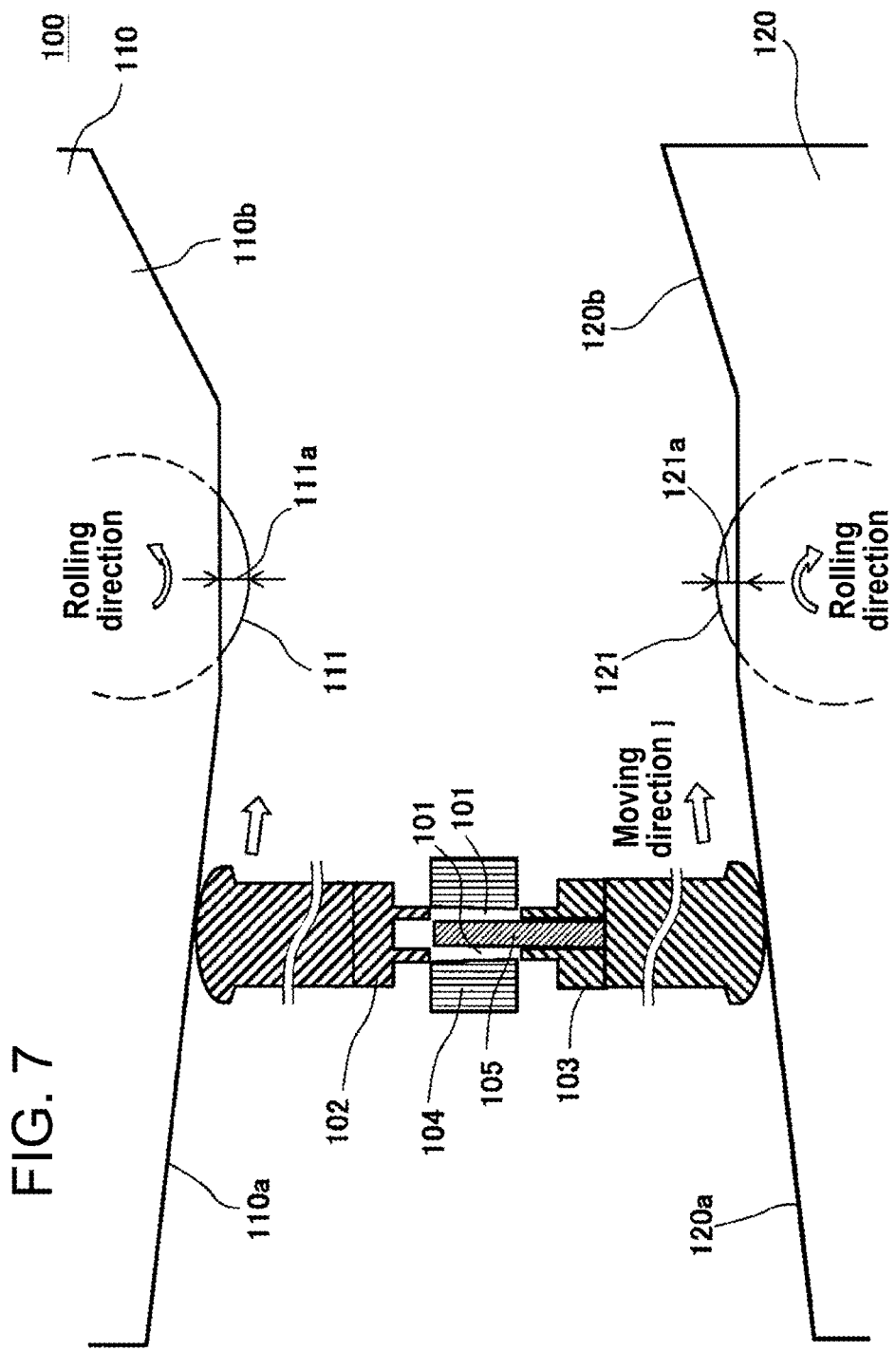
FIG. 7 is a sectional schematic view to illustrate a method for producing a pellet of a positive electrode.

FIG. 7 is a sectional schematic view to illustrate a method for producing a pellet. The pellet is produced by compression-molding a positive electrode material mixture including manganese dioxide, a conductive agent, and the like, using compression device 100 shown in FIG. 7. Compression device 100 includes a tableting machine including hollow cylindrical die 104 for shaping a circumferential surface of the pellet, lower die 103 having a protrusion to be inserted into a bottom part of hollow portion 101 of die 104, and upper die 102 having a protrusion to be inserted into an upper part of hollow portion 101 of die 104. In the center of the protrusion of lower die 103, center pin 105 for shaping a hollow portion of a pellet protrudes upward. The center of the protrusion of upper die 102 has a recess into which an upper end portion of center pin 105 can be inserted. Upper die 102, lower die 103, die 104, and center pin 105 form a cylindrical space corresponding to a shape of the pellet inside die 104. The positive electrode material mixture is filled in this space in advance, and then, upper die 102 is pressed downward and lower die 103 is pressed upward, respectively, so as to form a cylindrical pellet.

Compression device 100 includes upper cam 110 and lower cam 120 for compressing the positive electrode material mixture filled in die 104. Upper cam 110 includes descending part 110a in which a bottom surface that is brought into contact with the tableting machine is inclined downward, ascending part 110b in which a bottom surface is inclined upward, and tableting roller 111 disposed between descending part 110a and ascending part 110b. Lower cam 120 has an upper surface facing the bottom surface of upper cam 110. Lower cam 120 includes ascending part 120a in which an upper surface of lower cam 120 is inclined upward in a region facing descending part 110a, and ascending part 120b in which the upper surface of lower cam 120 is inclined upward in a region facing ascending part 110b. Lower cam 120 includes tableting roller 121 in a position, which faces tableting roller 111, between ascending parts 120a and 120b.

Then, the tableting machine is allowed to move from ascending part 120a toward ascending part 120b side of lower cam 120, and upper die 102 and lower die 103 of the tableting machine are pressed by upper cam 110 and lower cam 120, respectively. Thereby, the positive electrode material mixture in hollow portion 101 is being compressed. Then, the positive electrode material mixture is molded at a high pressure by tableting rollers 111 and 121. Thus, a pellet is completed. Since the bottom surface of ascending part 110b of upper cam 110 is inclined upward, pressure by upper die 102 is loosened. At the same time, since the upper surface of ascending part 120b of lower cam 120 is inclined upward, the pellet is pressed from the lower part toward the upper part by the protrusion of lower die 103. Thus, the pellet compression-molded in die 104 is pushed up from the lower part, so that the pellet can be taken out.

The distribution state of the density of manganese dioxide and/or the surface hardness in the pellet is largely influenced by a displacement amount and/or a pressing speed in the vertical direction when the positive electrode material mixture is compressed. Specifically, when the displacement amount is increased, the density is increased. When the pressing speed is increased, density of pellets is increased at an end portion at a side at which a pressing pressure is applied.

For example, when part 111a (protrusion margin) protruding from the bottom surface of upper cam 110 of upper-side tableting roller 111 is set to be larger than part 121a (protrusion margin) protruding from the upper surface of lower cam 120 of lower-side tableting roller 121, a displacement amount at the upper side is increased. Therefore, the density of the upper side of the pellet is increased. Furthermore, when the gradient of descending part 110a of upper cam 110 is set to be steeper than that of ascending part 120a of lower cam 120, a displacement amount at the upper side is increased. Consequently, the density at the upper side of the pellet is increased. Furthermore, when the protrusion margins at the upper and lower sides are the same as each other, the density in the upper side of the pellet can be increased also by making a diameter of upper-side tableting roller 111 be smaller than that of lower-side tableting roller 121. This is because a small diameter of the tableting roller shortens a time from when the upper die moves onto the roller to a time when tableting is finally carried out. In other words, it is because a tableting speed of the upper die is increased.

Furthermore, when compression is quickly carried out by the upper and lower tableting rollers, a pellet having a higher density in the upper and lower end portions and a lower density in a center portion is easily obtained. The reason why the density becomes lower in the center portion is considered because a pressure applied from the tableting roller is lost from the end portions toward the center portion. When a compression speed by the tableting roller is increased, the gradient of the density between the end portions and the center portion is increased. When the compression speed is reduced, the gradient of the density becomes moderate.

Use of the thus obtained pellet whose distribution state of the density of manganese dioxide is changed enables the distribution state of the density of manganese dioxide in the positive electrode to be adjusted. Furthermore, the distribution state of the density of manganese dioxide in the positive electrode can be controlled by using a plurality of pellets whose distribution state of the density of manganese dioxide is adjusted, and changing arrangement thereof, or combining pellets having different distribution states of the density of manganese dioxide. The surface hardness of the positive electrode can be controlled in the same manner as in the case of the density of manganese dioxide.

When the positive electrode includes a plurality of pellets, the sizes of the pellet may be the same as or different from each other. When a stack is composed of or containing three or more pellets, the size of a part of the pellets may be the same as each other.

As manganese dioxide as the positive electrode active material, electrolytic manganese dioxide is preferable.

The manganese dioxide is used in a form of powder. In view of easily achieving the filling property of the positive electrode and diffusivity of an electrolytic solution in the positive electrode, the average particle diameter (D50) of manganese dioxide is, for example, 25 to 60 µm. In view of moldability and suppression of expansion of the positive electrode, a BET specific surface area of manganese dioxide may be, for example, 15 to 50 m²/g.

Note here that the average particle diameter (D50) in this specification is a median diameter in a volumetric particle size distribution. The average particle diameter is calculated using, for example, a laser diffraction/scattering particle size distribution meter. Furthermore, the BET specific surface area is obtained by measuring and calculating a surface area using a BET equation, which is a theoretical equation of multilayer adsorption. The BET specific surface area can be measured using, for example, a specific surface area measuring device by a nitrogen adsorption method.

The positive electrode further includes a conductive agent in addition to the positive electrode active material, and usually further includes an alkaline electrolytic solution. Furthermore, the positive electrode may further include a binder as necessary.

Examples of the conductive agent include carbon black such as acetylene black, and a conductive carbon material such as graphite. As the graphite, natural graphite, artificial graphite, and the like, can be used. The conductive agent may be fibrous and the like, but it is preferably powdery. The average particle diameter (D50) of the conductive agent is, for example, 3 to 30 µm.

The content of the conductive agent in the positive electrode is, for example, 3 to 10 parts by mass and preferably 4 to 6 parts by mass with respect to 100 parts by mass of manganese dioxide.

The pellet is obtained by compression-molding a positive electrode material mixture including, for example, a positive electrode active material, a conductive agent, an alkaline electrolytic solution, and a binder as necessary, into a hollow cylindrical shape as mentioned above. The positive electrode material mixture may be made into a flake shape or a granular shape, and classified as necessary, followed by compression-molding. The pellet is inserted into the battery case, and then the pellet may be subjected to secondary pressurization as necessary.

Negative Electrode

A negative electrode is disposed in a hollow portion of positive electrode pellets. The negative electrode has a gelled form. The negative electrode usually contains powder of zinc or a zinc alloy as a negative electrode active material, an alkaline electrolytic solution, and a gelling agent.

In view of corrosion resistance, the zinc alloy preferably includes at least one selected from the group consisting of indium, bismuth and aluminum. The negative electrode active material is usually used in a form of powder. In view of the filling property of the negative electrode and diffusivity of an alkaline electrolytic solution inside the negative electrode, the average particle diameter (D50) of the negative electrode active material powder is, for example, 100 to 200 µm, and preferably 110 to 160 µm.

The gelling agent is not particularly limited and any well-known gelling agents to be used in the field of alkaline dry batteries can be used. For example, a thickener and/or a water absorbing polymer can be used. Examples of such gelling agents include polyacrylic acid and sodium polyacrylate.

The addition amount of the gelling agent is, for example, 0.5 to 2 parts by mass with respect to 100 parts by mass of the negative electrode active material.

The content of powder of zinc or a zinc alloy is, for example, 170 to 220 parts by mass with respect to 100 parts by mass of the alkaline electrolytic solution.

For the negative electrode, for adjusting the viscosity of zinc, surfactants such as a polyoxyalkylene group-containing compound, and phosphate ester (for example, phosphate ester or an alkali metal salt thereof, and the like) may be used.

Negative Electrode Current Collector

A negative electrode current collector is inserted into a gelled negative electrode. Examples of material of the negative electrode current collector include copper, and may be an alloy containing copper and zinc, for example, brass. The negative electrode current collector may be subjected to metal plating such as tin plating, as necessary.

Separator

Examples of a separator interposed between a positive electrode and a negative electrode include non-woven fabric and microporous films. Examples of material of the separator include cellulose, polyvinyl alcohol, and the like. As the non-woven fabric, for example, one mainly including fibers of these materials is used. As the microporous films, cellophane and the like is used.

FIG. 1 shows a bottomed cylindrical separator, but the separator is not necessarily limited to this and any well-known separators used in the field of alkaline dry batteries can be used. For example, a cylindrical separator and a bottom insulator (or a bottom separator) may be used together.

A thickness of the separator is, for example, 200 to 300 μm. The separator preferably has the above-mentioned thickness as a whole, and when a separator is composed by stacking a plurality of sheets, the total thickness of the sheets is preferably in the above-mentioned range.

Alkaline Electrolytic Solution

An alkaline electrolytic solution is included in a positive electrode, a negative electrode and a separator. As the alkaline electrolytic solution, for example, an alkaline aqueous solution including potassium hydroxide is used. The concentration of potassium hydroxide in the alkaline electrolytic solution is preferably 30 to 50% by mass. The alkaline aqueous solution may further contain zinc oxide. The concentration of zinc oxide in the alkaline electrolytic solution is, for example, 1 to 5% by mass.

Battery Case

A bottomed cylindrical case is used as a battery case. The battery case is made of, for example, a nickel-plated steel sheet. In order to achieve high adhesion between the positive electrode and the battery case, the inner surface of the battery case may be coated with a carbon coating film.

The battery case includes a circular bottom portion, and a cylindrical body portion integrated with the bottom portion and extending from the circumference of the bottom portion in the vertical direction to the bottom portion (in the height direction of the battery or the positive electrode). When a thickness of the body portion is small, the outer diameter of the battery tends to be increased. Meanwhile, increase in a thickness is disadvantageous in view of increasing capacity. Therefore, the thickness of the body portion is preferably 0.08 to 0.20 mm. Furthermore, even when the thickness of the body portion is thin, for example, 0.08 to 0.16 mm, or 0.08 to 0.14 mm, in the present invention, it is possible to suppress the increase in the outer diameter of the battery by controlling the distribution of the density of manganese dioxide and/or the surface hardness in the positive electrode. In addition, even with such a small thickness, a rupture of the battery case can be suppressed.

In the present invention, a high capacity can be obtained, the increase in an outer diameter of a battery can be suppressed, and a rupture of a body portion of a battery case can be suppressed. Therefore, in particular, the present invention is suitable for batteries such as AA batteries and AAA batteries.

EXAMPLES

Hereinafter, the present invention is described specifically based on Examples and Comparative Examples, but the present invention is not necessarily limited to the following Examples.

Examples 1 to 7 and Comparative Examples 1 to 2

AA alkaline dry batteries (LR6) shown in FIG. 1 were produced according to the following procedures (1) to (3).
(1) Production of Positive Electrode
(a) Production of Pellet A positive electrode material mixture the same as that used for deriving the formula (1) was prepared by the following procedures.

Electrolytic manganese dioxide powder (manganese dioxide purity: 92%, average particle diameter D50: 40 μm, BET specific surface area: 26 m$^2$/g) as a positive electrode active material, graphite powder as a conductive agent, and polytetrafluoroethylene as a binder were mixed with each other. An electrolytic solution was added to the resultant mixture. These were sufficiently stirred, then compression-molded into flakes, and further pulverized into granules to obtain a positive electrode material mixture. The mass ratio of the respective components, that is, the ratio of electrolytic manganese dioxide powder:graphite powder:electrolytic solution, was set to 95:5:2. The binder was used at the rate of 0.2% by mass with respect to electrolytic manganese dioxide. The electrolytic solution to be used was an alkaline aqueous solution including potassium hydroxide (concentration: 35% by mass) and zinc oxide (concentration: 2% by mass).

The positive electrode material mixture was pressure-molded into a hollow cylindrical shape using compression device 100 shown in FIG. 7 to produce two pellets each having an outer diameter of 13.60 mm, an inner diameter of 8.85 mm, and a height of 21.8 mm (Example 1). By adjusting a protrusion margin or a compression speed of a tableting roller at this time, distribution states of the density of manganese dioxide and the surface hardness in each pellet were adjusted to have states shown in FIG. 2.

Figure 8:
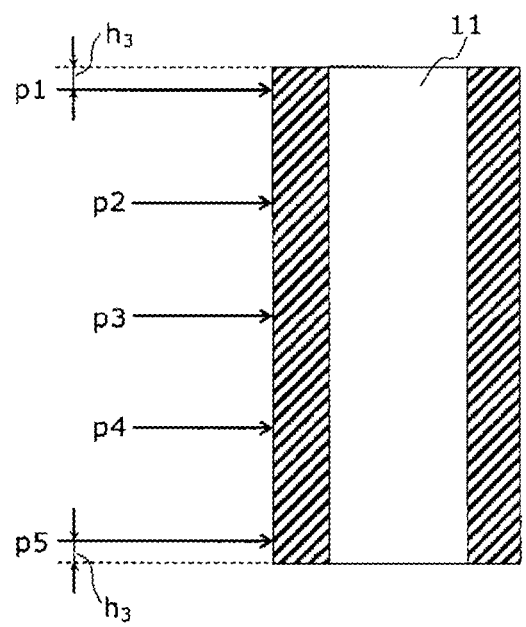
FIG. 8 is a schematic longitudinal sectional view to illustrate an actual position for measuring surface hardness of a pellet after molding in Examples.

Furthermore, two pellets each for Example and Comparative Examples were produced by changing the filling amount of the positive electrode material mixture and the protrusion margin and/or the compression speed of the tableting roller.
(b) Check of Surface Hardness Distribution of Pellet after Molding Surface hardness of the pellet obtained in the above (a) was measured, and check was performed whether the surface hardness distribution was the desired one. FIG. 8 is a schematic longitudinal sectional view to illustrate measuring points of the surface hardness of the pellet. FIG. 8 is shown such that an upper end of a pellet at the time of molding is located in the upper side and a lower end of the pellet at the time of molding is located in the lower side. Firstly, a position in the height $h_3$ (=0.5 mm) from the upper end of the pellet is defined as p1, and a position in the height $h_3$ (=0.5 mm) from the lower end of the pellet is defined as p5, and a portion between p1 and P5 is divided into four sections at p2, p3 and P4, respectively, such that each portion has the same height. Then, in each of the points p1 to p5 on the circumferential surface of the pellet, the surface hardness (Vickers hardness) was measured in accordance with JIS Z2244 under conditions of a test force of 1 N and a holding time of 15 seconds.

Tables 1A and 1B show the surface hardness in the produced pellets. Note here that in the battery, a pellet disposed at a positive terminal side is defined as a pellet in the first stage, and a pellet disposed at an opposite side to the positive terminal side is defined as a pellet in the second stage. The direction of each pellet is aligned to the direction of the pellet in the battery.

TABLE 1A

| n | Pellet stage number | | Measurement position of surface hardness in each pellet | Surface hardness (HV) |
|---|---|---|---|---|
| | | | Production time of pellet | |
| B1 | 2 | Second stage | p1 | 7.93 |
| | | | p2 | 7.57 |
| | | | p3 | 7.61 |
| | | | p4 | 7.17 |
| | | | p5 | 7.07 |
| | | First stage | p1 | 7.05 |
| | | | p2 | 7.33 |
| | | | p3 | 7.37 |
| | | | p4 | 7.73 |
| | | | p5 | 7.69 |
| B2 | 2 | Second stage | p1 | 7.93 |
| | | | p2 | 7.57 |
| | | | p3 | 7.61 |
| | | | p4 | 7.17 |
| | | | p5 | 7.07 |
| | | First stage | p1 | 7.05 |
| | | | p2 | 7.33 |
| | | | p3 | 7.37 |
| | | | p4 | 7.73 |
| | | | p5 | 7.69 |
| A1 | 2 | Second stage | p1 | 12.35 |
| | | | p2 | 9.30 |
| | | | p3 | 7.17 |
| | | | p4 | 5.75 |
| | | | p5 | 5.02 |
| | | First stage | p1 | 4.99 |
| | | | p2 | 5.80 |
| | | | p3 | 7.13 |
| | | | p4 | 9.37 |
| | | | p5 | 12.30 |
| A2 | 2 | Second stage | p1 | 13.55 |
| | | | p2 | 9.98 |
| | | | p3 | 7.80 |
| | | | p4 | 4.55 |
| | | | p5 | 4.10 |
| | | First stage | p1 | 4.05 |
| | | | p2 | 4.45 |
| | | | p3 | 7.90 |
| | | | p4 | 10.09 |
| | | | p5 | 13.72 |
| A3 | 2 | Second stage | p1 | 15.82 |
| | | | p2 | 10.25 |
| | | | p3 | 7.55 |
| | | | p4 | 4.20 |
| | | | p5 | 3.36 |
| | | First stage | p1 | 3.30 |
| | | | p2 | 4.13 |
| | | | p3 | 7.52 |
| | | | p4 | 10.22 |
| | | | p5 | 15.88 |

TABLE 1B

| n | Pellet stage number | | Measurement position of surface hardness in each pellet | Surface hardness (HV) |
|---|---|---|---|---|
| | | | Production time of pellet | |
| A4 | 2 | Second stage | p1 | 27.60 |
| | | | p2 | 17.10 |
| | | | p3 | 9.28 |
| | | | p4 | 5.56 |
| | | | p5 | 3.63 |

TABLE 1B-continued

| n | Pellet stage number | | Measurement position of surface hardness in each pellet | Surface hardness (HV) |
|---|---|---|---|---|
| | | | Production time of pellet | |
| | | First stage | p1 | 3.58 |
| | | | p2 | 5.60 |
| | | | p3 | 9.10 |
| | | | p4 | 16.96 |
| | | | p5 | 27.72 |
| A5 | 2 | Second stage | p1 | 38.00 |
| | | | p2 | 22.82 |
| | | | p3 | 12.62 |
| | | | p4 | 6.84 |
| | | | p5 | 3.90 |
| | | First stage | p1 | 3.85 |
| | | | p2 | 6.60 |
| | | | p3 | 12.58 |
| | | | p4 | 23.30 |
| | | | p5 | 38.13 |
| A6 | 2 | Second stage | p1 | 48.20 |
| | | | p2 | 29.90 |
| | | | p3 | 15.44 |
| | | | p4 | 8.04 |
| | | | p5 | 4.02 |
| | | First stage | p1 | 4.00 |
| | | | p2 | 7.90 |
| | | | p3 | 15.30 |
| | | | p4 | 29.56 |
| | | | p5 | 47.80 |
| A7 | 2 | Second stage | p1 | 58.65 |
| | | | p2 | 36.06 |
| | | | p3 | 18.47 |
| | | | p4 | 9.25 |
| | | | p5 | 4.13 |
| | | First stage | p1 | 4.07 |
| | | | p2 | 9.20 |
| | | | p3 | 18.37 |
| | | | p4 | 36.00 |
| | | | p5 | 58.70 |

(2) Production of Negative Electrode

Zinc alloy powder as a negative electrode active material (average particle diameter D50: 130 μm), the above-mentioned electrolytic solution, and a gelling agent were mixed with each other to obtain gelled negative electrode 3. As the zinc alloy, a zinc alloy including 0.02% by mass of indium, 0.01% by mass of bismuth, and 0.005% by mass of aluminum was used. For the gelling agent, a mixture including crosslinked and branched polyacrylic acid and highly crosslinked chain sodium polyacrylate at a mass ratio of 1:2 was used. The mass ratio of negative electrode active material:electrolytic solution:gelling agent was set to 200:100:2.

(3) Assembly of Alkaline Battery

Varniphite manufactured by Nippon Graphite Industries, Ltd. was applied onto the inner surface of a battery case having a bottomed cylindrical shape, being made of a nickel-plated steel plate, and having a body portion thickness shown in Tables 1C, 1D, and 1E so as to form a carbon coating film having the thickness of about 10 μm. Thus, battery case 1 was obtained. Two positive electrode pellets were inserted into battery case 1 in the longitudinal direction, which were subjected to secondary pressurization, and positive electrode 2 was completed in battery case 1. The bottomed cylindrical separator was disposed at the inner side of positive electrode 2. Then, the above-mentioned electrolytic solution was poured, and separator 4 was impregnated with the electrolytic solution. This state was left for a predetermined time to infiltrate the electrolytic solution from separator 4 into positive electrode 2. Thereafter, a predetermined amount of gelled negative electrode 3 was filled into the inner side of separator 4. Separator 4 used was a non-woven fabric mainly including solvent-spun cellulose fibers and polyvinyl alcohol fibers mixed in a mass ratio of 1:1.

General brass (Cu content: about 65% by mass, Zn content: about 35% by mass) was pressed into a nail shape, and then the surface thereof was plated with tin to obtain negative electrode current collector 6. The head of negative electrode current collector 6 was electrically welded to negative electrode terminal plate 7 made of a nickel plated steel plate. Thereafter, the body portion of negative electrode current collector 6 was press-fitted into the through-hole at the center of gasket 5 mainly including polyamide 6, 12. In this way, sealing unit 9 consisting of gasket 5, negative electrode terminal plate 7, and negative electrode current collector 6 was produced.

Next, sealing unit 9 was installed in an opening of battery case 1. At this time, the body portion of negative electrode current collector 6 was inserted into negative electrode 3. The opening end of battery case 1 was crimped onto the circumference of negative electrode terminal plate 7 via gasket 5 so as to seal the opening of battery case 1. The outer surface of battery case 1 was covered with outer label 8. In this way, alkaline dry batteries (the batteries A1 to A7 of Examples 1 to 7 and the batteries B1 to B2 of Comparative Examples 1 to 2) were produced. Note here that the batteries B1 and B2 are the same as each other except for the thickness of the body portion of the battery case.

(4) Evaluation

The obtained batteries were evaluated as follows.

(a) Measurement of Surface Hardness and Calculation of Density of Manganese Dioxide in Positive Electrode Each of the obtained alkaline dry batteries was disassembled and a positive electrode was taken out. The positive electrode was washed with water, and dried. Then, the surface hardness (Vickers hardness) was measured at positions P1 to P10 on the circumferential surface of the positive electrode by the aforementioned procedure. The measurement conditions were made to be the same as in the above-mentioned (1) (b). For the average value $H_e$ of the surface hardness $H_{e1}$ and $H_{e2}$ in both end portions, the average value of the surface hardness measured in P1 and P10 was used. For the surface hardness $H_c$ in the center portion, the average value of the surface hardness measured in P5 and P6 was used.

Furthermore, from the calculated $H_e$ and $H_c$, the ratio $H_c/H_e$ was obtained.

Furthermore, by the aforementioned procedure, a density $d_c$ of manganese dioxide in the center portion and an average value of densities $d_e$ of manganese dioxide in both end portions were calculated. The density $d_c$ of manganese dioxide was calculated from the formula (1) using the average value of the surface hardness measured in P5 and P6. Densities $d_e$ of manganese dioxide density were calculated from the formula (1) using the average value of surface hardness $H_e$.

Furthermore, from the calculated $d_e$ and $d_c$, the ratio $d_c/d_e$ (%) was obtained.

(b) Average Density of Manganese Dioxide in Positive Electrode

An average density of manganese dioxide of a positive electrode pellet taken out from each battery was obtained by the aforementioned procedure.

(c) Swelling Amount of Outer Diameter and Rupture of Battery Case

A battery was continuously discharged at resistance of 40Ω. One week after, a rupture of a body portion of a battery case was visually observed. The battery one week after the production is defined as a battery in an initial state. The number of batteries among 10 batteries, in which a rupture of a battery case occurred, was counted.

For a battery in which a rupture did not occur in the body portion, the maximum diameter of the body portion was measured using a vernier caliper, a difference between the measured diameter and the diameter of the body portion in the initial state was calculated. The difference was obtained as a swelling amount of the outer diameter of the battery case.

Results of Examples 1 to 7 and Comparative Examples 1 to 2 are shown in Tables 1C, 1D and 1E. Examples 1 to 7 are A1 to A7, and Comparative Examples 1 to 2 are B1 to B2.

TABLE 1C

| | Thickness of body portion of battery case (mm) | MnO$_2$ average density (g/cm$^3$) | Positive electrode in battery | | | | | | Swelling amount of outer diameter of battery case (mm) | Rupture of battery case (number/10) |
|---|---|---|---|---|---|---|---|---|---|---|
| | | | Surface hardness measurement position in stack | Surface hardness (HV) | Average value of surface hardness (HV) | $H_c/H_e$ (%) | MnO$_2$ density (g/cm$^3$) | $d_c/d_e$ (%) | | |
| B1 | 0.18 | 2.800 | P1 | 7.93 | 7.85 | 100.6 | 2.800 | 100.0 | 0.30 | 0 |
| | | | P2 | 7.77 | | | | | | |
| | | | P3 | 8.01 | | | | | | |
| | | | P4 | 7.77 | | | | | | |
| | | | P5 | 7.87 | 7.86 | | 2.801 | | | |
| | | | P6 | 7.85 | | | | | | |
| | | | P7 | 7.93 | | | | | | |
| | | | P8 | 7.77 | | | | | | |
| | | | P9 | 7.93 | 7.81 | | 2.800 | | | |
| | | | P10 | 7.69 | | | | | | |
| B2 | 0.16 | 2.800 | P1 | 7.93 | 7.85 | 100.6 | 2.800 | 100.0 | — | 2 |
| | | | P2 | 7.77 | | | | | | |
| | | | P3 | 8.01 | | | | | | |
| | | | P4 | 7.77 | | | | | | |
| | | | P5 | 7.87 | 7.86 | | 2.801 | | | |
| | | | P6 | 7.85 | | | | | | |
| | | | P7 | 7.93 | | | | | | |
| | | | P8 | 7.77 | | | | | | |
| | | | P9 | 7.03 | 7.81 | | 2.800 | | | |
| | | | P10 | 7.69 | | | | | | |

TABLE 1C-continued

| | Thickness of body portion of battery case (mm) | MnO$_2$ average density (g/cm$^3$) | Positive electrode in battery | | | | | | Swelling amount of outer diameter of battery case (mm) | Rupture of battery case (number/10) |
|---|---|---|---|---|---|---|---|---|---|---|
| | | | Surface hardness measurement position in stack | Surface hardness (HV) | Average value of surface hardness (HV) | $H_c/H_e$ (%) | MnO$_2$ density (g/cm$^3$) | $d_c/d_e$ (%) | | |
| A1 | 0.16 | 2.800 | P1 | 12.35 | 10.93 | 47.1 | 2.843 | 97.5 | 0.11 | 0 |
| | | | P2 | 9.50 | | | | | | |
| | | | P3 | 7.57 | | | | | | |
| | | | P4 | 6.35 | | | | | | |
| | | | P5 | 5.82 | 5.81 | | 2.771 | | | |
| | | | P6 | 5.79 | | | | | | |
| | | | P7 | 6.40 | | | | | | |
| | | | P8 | 7.53 | | | | | | |
| | | | P9 | 9.57 | 10.94 | | 2.844 | | | |
| | | | P10 | 12.30 | | | | | | |

TABLE 1D

| | Thickness of body portion of battery case (mm) | MnO$_2$ average density (g/cm$^3$) | Positive electrode in battery | | | | | | Swelling amount of outer diameter of battery case (mm) | Rupture of battery case (number/10) |
|---|---|---|---|---|---|---|---|---|---|---|
| | | | Surface hardness measurement position in stack | Surface hardness (HV) | Average value of surface hardness (HV) | $H_c/H_e$ (%) | MnO$_2$ density (g/cm$^3$) | $d_c/d_e$ (%) | | |
| A2 | 0.16 | 2.800 | P1 | 13.55 | 11.87 | 35.8 | 2.857 | 96.5 | 0.08 | 0 |
| | | | P2 | 10.18 | | | | | | |
| | | | P3 | 8.20 | | | | | | |
| | | | P4 | 5.15 | | | | | | |
| | | | P5 | 4.90 | 4.88 | | 2.758 | | | |
| | | | P6 | 4.85 | | | | | | |
| | | | P7 | 5.05 | | | | | | |
| | | | P8 | 8.30 | | | | | | |
| | | | P9 | 10.29 | 12.01 | | 2.859 | | | |
| | | | P10 | 13.72 | | | | | | |
| A3 | 0.16 | 2.800 | P1 | 15.82 | 13.14 | 26.1 | 2.875 | 95.6 | 0.04 | 0 |
| | | | P2 | 10.45 | | | | | | |
| | | | P3 | 7.95 | | | | | | |
| | | | P4 | 4.80 | | | | | | |
| | | | P5 | 4.16 | 4.18 | | 2.748 | | | |
| | | | P6 | 4.10 | | | | | | |
| | | | P7 | 4.73 | | | | | | |
| | | | P8 | 7.92 | | | | | | |
| | | | P9 | 10.42 | 13.15 | | 2.875 | | | |
| | | | P10 | 15.88 | | | | | | |
| A4 | 0.16 | 2.850 | P1 | 27.60 | 22.45 | 15.9 | 3.006 | 91.6 | 0.05 | 0 |
| | | | P2 | 17.30 | | | | | | |
| | | | P3 | 9.68 | | | | | | |
| | | | P4 | 6.16 | | | | | | |
| | | | P5 | 4.43 | 4.41 | | 2.752 | | | |
| | | | P6 | 4.38 | | | | | | |
| | | | P7 | 6.20 | | | | | | |
| | | | P8 | 9.50 | | | | | | |
| | | | P9 | 17.16 | 22.44 | | 3.006 | | | |
| | | | P10 | 27.72 | | | | | | |

TABLE 1E

| | Thickness of body portion of battery case (mm) | MnO$_2$ average density (g/cm$^3$) | Positive electrode in battery | | | | | | Swelling amount of outer diameter of battery case (mm) | Rupture of battery case (number/10) |
|---|---|---|---|---|---|---|---|---|---|---|
| | | | Surface hardness measurement position in stack | Surface hardness (HV) | Average value of surface hardness (HV) | $H_c/H_e$ (%) | MnO$_2$ density (g/cm$^3$) | $d_c/d_e$ (%) | | |
| A5 | 0.16 | 2.900 | P1 | 38.00 | 30.51 | 12.3 | 3.119 | 88.3 | 0.06 | 0 |
| | | | P2 | 23.02 | | | | | | |
| | | | P3 | 13.02 | | | | | | |
| | | | P4 | 7.44 | | | | | | |
| | | | P5 | 4.70 | 4.68 | | 2.755 | | | |
| | | | P6 | 4.65 | | | | | | |
| | | | P7 | 7.20 | | | | | | |

TABLE 1E-continued

| | Thickness of body portion of battery case (mm) | MnO$_2$ average density (g/cm$^3$) | Positive electrode in battery | | | | | | Swelling amount of outer diameter of battery case (mm) | Rupture of battery case (number/10) |
|---|---|---|---|---|---|---|---|---|---|---|
| | | | Surface hardness measurement position in stack | Surface hardness (HV) | Average value of surface hardness (HV) | $H_c/H_e$ (%) | MnO$_2$ density (g/cm$^3$) | $d_c/d_e$ (%) | | |
| | | | P8 | 12.98 | | | | | | |
| | | | P9 | 23.50 | 30.82 | | 3.124 | | | |
| | | | P10 | 38.13 | | | | | | |
| A6 | 0.16 | 2.950 | P1 | 48.20 | 39.15 | 10.0 | 3.241 | 85.1 | 0.07 | 0 |
| | | | P2 | 30.10 | | | | | | |
| | | | P3 | 15.84 | | | | | | |
| | | | P4 | 8.64 | | | | | | |
| | | | P5 | 4.82 | 4.81 | | 2.757 | | | |
| | | | P6 | 4.80 | | | | | | |
| | | | P7 | 8.50 | | | | | | |
| | | | P8 | 15.70 | | | | | | |
| | | | P9 | 29.76 | 38.78 | | 3.236 | | | |
| | | | P10 | 47.80 | | | | | | |
| A7 | 0.16 | 3.000 | P1 | 58.65 | 47.46 | 8.4 | 3.358 | 82.2 | 0.08 | 0 |
| | | | P2 | 36.26 | | | | | | |
| | | | P3 | 18.87 | | | | | | |
| | | | P4 | 9.85 | | | | | | |
| | | | P5 | 4.93 | 4.90 | | 2.759 | | | |
| | | | P6 | 4.87 | | | | | | |
| | | | P7 | 9.80 | | | | | | |
| | | | P8 | 18.77 | | | | | | |
| | | | P9 | 36.20 | 47.45 | | 3.358 | | | |
| | | | P10 | 58.70 | | | | | | |

As shown in Table 1C, in Comparative Example 1 and Comparative Example 2 in which distributions of the surface hardness and the density of manganese dioxide of the positive electrode are uniform, the swelling amount of the outer diameter of the battery case is large. In Comparative Example 2, a rupture was observed in the body portion of the battery case in 20% of batteries. On the contrary, in Examples in which $H_c/H_e$ is 48% or less or $d_c/d_e$ is 98% or less, the swelling of the battery case is considerably reduced as compared with Comparative Examples, and 0% of batteries had a rupture in the battery cases (see Tables 1D and 1E).

Examples 8 to 12

Alkaline dry batteries were produced in the same manner as in Example 7 except that the thickness of the body portion of the battery case was changed as shown in Tables 2A and 2B, and the produced dry batteries were evaluated. Results are shown in Tables 2A and 2B. Examples 8 to 12 are A8 to A12.

TABLE 2A

| | n | Thickness of body portion of battery case (mm) | MnO$_2$ average density (g/cm$^3$) | Positive electrode in battery | | | | | | Swelling amount of outer diameter of battery case (mm) | Rupture of battery case (number/10) |
|---|---|---|---|---|---|---|---|---|---|---|---|
| | | | | Surface hardness measurement position in stack | Surface hardness (HV) | Average value of surface hardness (HV) | $H_c/H_e$ (%) | MnO$_2$ density (g/cm$^3$) | $d_c/d_e$ (%) | | |
| A8 | 2 | 0.14 | 3.000 | P1 | 58.65 | 47.40 | 8.4 | 3.358 | 82.1 | 0.11 | 0 |
| | | | | P2 | 36.26 | | | | | | |
| | | | | P3 | 18.87 | | | | | | |
| | | | | P4 | 9.85 | | | | | | |
| | | | | P5 | 4.93 | 4.90 | | 2.759 | | | |
| | | | | P6 | 4.87 | | | | | | |
| | | | | P7 | 9.80 | | | | | | |
| | | | | P8 | 18.77 | | | | | | |
| | | | | P9 | 36.20 | 47.45 | | 3.358 | | | |
| | | | | P10 | 58.70 | | | | | | |
| A9 | 2 | 0.12 | 3.000 | P1 | 58.65 | 47.46 | 8.4 | 3.358 | 82.1 | 0.13 | 0 |
| | | | | P2 | 36.26 | | | | | | |
| | | | | P3 | 18.87 | | | | | | |
| | | | | P4 | 9.85 | | | | | | |
| | | | | P5 | 4.93 | 4.90 | | 2.759 | | | |
| | | | | P6 | 4.87 | | | | | | |
| | | | | P7 | 9.80 | | | | | | |
| | | | | P8 | 18.77 | | | | | | |
| | | | | P9 | 36.20 | 47.45 | | 3.358 | | | |
| | | | | P10 | 58.70 | | | | | | |

TABLE 2B

| | n | Thickness of body portion of battery case (mm) | MnO$_2$ average density (g/cm$^3$) | Surface hardness measurement position in stack | Surface hardness (HV) | Average value of surface hardness (HV) | H$_c$/H$_e$ (%) | MnO$_2$ density (g/cm$^3$) | d$_c$/d$_e$ (%) | Swelling amount of outer diameter of battery case (mm) | Rupture of battery case (number/10) |
|---|---|---|---|---|---|---|---|---|---|---|---|
| A10 | 2 | 0.10 | 3.000 | P1 | 58.65 | 47.46 | 8.4 | 3.858 | 82.1 | 0.16 | 0 |
| | | | | P2 | 36.26 | | | | | | |
| | | | | P3 | 18.87 | | | | | | |
| | | | | P4 | 9.85 | | | | | | |
| | | | | P5 | 4.93 | 4.90 | | 2.759 | | | |
| | | | | P6 | 4.87 | | | | | | |
| | | | | P7 | 9.80 | | | | | | |
| | | | | P8 | 18.77 | | | | | | |
| | | | | P9 | 36.20 | 47.45 | | 3.358 | | | |
| | | | | P10 | 58.70 | | | | | | |
| A11 | 2 | 0.08 | 3.000 | P1 | 58.65 | 47.46 | 8.4 | 3.358 | 82.1 | 0.19 | 0 |
| | | | | P2 | 36.26 | | | | | | |
| | | | | P3 | 18.87 | | | | | | |
| | | | | P4 | 9.85 | | | | | | |
| | | | | P5 | 4.93 | 4.90 | | 2.759 | | | |
| | | | | P6 | 4.87 | | | | | | |
| | | | | P7 | 9.80 | | | | | | |
| | | | | P8 | 18.77 | | | | | | |
| | | | | P9 | 30.20 | 47.45 | | 3.358 | | | |
| | | | | P10 | 58.70 | | | | | | |
| A12 | 2 | 0.07 | 3.000 | P1 | 58.65 | 47.46 | 8.4 | 3.358 | 82.1 | 0.21 | 0 |
| | | | | P2 | 36.26 | | | | | | |
| | | | | P3 | 18.87 | | | | | | |
| | | | | P4 | 9.85 | | | | | | |
| | | | | P5 | 4.93 | 4.90 | | 2.759 | | | |
| | | | | P6 | 4.87 | | | | | | |
| | | | | P7 | 9.80 | | | | | | |
| | | | | P8 | 18.77 | | | | | | |
| | | | | P9 | 36.20 | 47.45 | | 3.358 | | | |
| | | | | P10 | 58.70 | | | | | | |

As shown in Tables 2A and 2B, also in Example 8 to 12 in which H$_c$/H$_e$ is 48% or less or d$_c$/d$_e$ is 98% or less, swelling of the outer diameter of the battery case is suppressed as compared with Comparative Examples 1 to 2 in Table 1C, 0% of batteries had a rupture in the battery cases.

Example 13

A positive electrode and a manganese dry battery were produced in the same manner as in Example 1 except that one pellet having a height of 43.5 mm was produced and the pellet was used as a positive electrode in Example 1(1), and a filling amount of a positive electrode material mixture as well as a protrusion margin and a compression speed of a tableting roller were adjusted so that the distribution states of the density of manganese dioxide and the surface hardness in the positive electrode became the states shown in FIG. 4. The produced battery was evaluated.

Example 14

A positive electrode and a manganese dry battery were produced in the same manner as in Example 1 except that three pellets each having a height of 14.5 mm were produced in Example 1(1), a positive electrode and a manganese dry battery shown in FIG. 5 were produced by using the three pellets, and a filling amount of a positive electrode material mixture as well as a protrusion margin and a compression speed of a tableting roller were adjusted so that the distribution states of the density of manganese dioxide and the surface hardness in the positive electrode became the states shown in FIG. 5 in production of pellets. Then, the produced battery was evaluated.

Example 15

A positive electrode and a manganese dry battery were produced in the same manner as in Example 1 except that four pellets each having a height of 10.9 mm were produced in Example 1(1), a positive electrode and a manganese dry battery shown in FIG. 6 were produced by using the four pellets, and a filling amount of a positive electrode material mixture as well as a protrusion margin and a compression speed of a tableting roller were adjusted in production of pellets so that the distribution states of the density of manganese dioxide and the surface hardness in the positive electrode became the states shown in FIG. 6. Then, the produced battery was evaluated.

The surface hardness of the pellets produced in Examples 13 to 15 is shown in Table 3A. The number of stages of the pellets is counted in such a manner that the number is increased toward the direction opposite to the positive terminal from a first stage, where a pellet disposed at a positive terminal side in a battery is defined as a first stage. The direction of each pellet is matched to the direction of the pellet in the battery. Furthermore, evaluation results of the batteries and the positive electrodes in the batteries of Example 13 to 15 are shown in Table 3B. Examples 13 to 15 are A13 to A15.

TABLE 3A

| | n | Pellet stage number | Production time of pellet Measurement position of surface hardness in each pellet | Surface hardness (HV) |
|---|---|---|---|---|
| A13 | 1 | First stage | p1 | 57.80 |
| | | | p2 | 18.90 |

TABLE 3A-continued

| n | Pellet stage number | Measurement position of surface hardness in each pellet | Surface hardness (HV) |
|---|---|---|---|
| | | p3 | 4.16 |
| | | p4 | 18.90 |
| | | p5 | 57.10 |
| A14 | 3 | Third stage p1 | 51.10 |
| | | p2 | 38.00 |
| | | p3 | 29.08 |
| | | p4 | 22.00 |
| | | p5 | 19.25 |
| | | Second stage p1 | 10.20 |
| | | p2 | 6.00 |
| | | p3 | 4.26 |
| | | p4 | 6.20 |
| | | p5 | 10.15 |
| | | First stage p1 | 19.25 |
| | | p2 | 22.50 |
| | | p3 | 29.68 |
| | | p4 | 37.50 |
| | | p5 | 50.93 |
| A15 | 4 | Fourth stage p1 | 41.99 |
| | | p2 | 37.80 |
| | | p3 | 34.20 |
| | | p4 | 31.40 |
| | | p5 | 29.70 |
| | | Third stage p1 | 12.10 |
| | | p2 | 9.10 |
| | | p3 | 6.78 |
| | | p4 | 5.20 |
| | | p5 | 4.45 |
| | | Second stage p1 | 4.43 |
| | | p2 | 5.30 |
| | | p3 | 6.80 |
| | | p4 | 9.05 |
| | | p5 | 12.18 |
| | | First stage p1 | 29.55 |
| | | p2 | 31.30 |
| | | p3 | 34.09 |
| | | p4 | 37.70 |
| | | p5 | 41.80 |

TABLE 3B

| | n | Thickness of body portion of battery case (mm) | $MnO_2$ average density (g/cm³) | Positive electrode in battery | | | | | | Swelling amount of outer diameter of battery case (mm) | Rupture of battery case (number/10) |
|---|---|---|---|---|---|---|---|---|---|---|---|
| | | | | Surface hardness measurement position in stack | Surface hardness (HV) | Average value of surface hardness (HV) | $H_c/H_e$ (%) | $MnO_2$ density (g/cm³) | $d_c/d_e$ (%) | | |
| A13 | 1 | 0.16 | 3.000 | P1 | 57.80 | 47.15 | 8.6 | 3.354 | 82.4 | 0.08 | 0 |
| | | | | P2 | 36.50 | | | | | | |
| | | | | P3 | 19.30 | | | | | | |
| | | | | P4 | 10.10 | | | | | | |
| | | | | P5 | 4.95 | 4.96 | | 2.759 | | | |
| | | | | P6 | 4.96 | | | | | | |
| | | | | P7 | 10.30 | | | | | | |
| | | | | P8 | 19.30 | | | | | | |
| | | | | P9 | 35.40 | 46.25 | | 3.341 | | | |
| | | | | P10 | 57.10 | | | | | | |
| A14 | 3 | 0.16 | 3.000 | P1 | 51.10 | 42.50 | 9.5 | 3.288 | 83.8 | 0.10 | 0 |
| | | | | P2 | 33.90 | | | | | | |
| | | | | P3 | 24.25 | | | | | | |
| | | | | P4 | 10.20 | | | | | | |
| | | | | P5 | 4.87 | 4.86 | | 2.758 | | | |
| | | | | P6 | 4.85 | | | | | | |
| | | | | P7 | 10.15 | | | | | | |
| | | | | P8 | 24.25 | | | | | | |
| | | | | P9 | 35.10 | 43.01 | | 3.296 | | | |
| | | | | P10 | 50.93 | | | | | | |
| A15 | 4 | 0.16 | 3.000 | P1 | 41.99 | 38.20 | 11.6 | 3.228 | 85.5 | 0.10 | 0 |
| | | | | P2 | 34.40 | | | | | | |
| | | | | P3 | 30.10 | | | | | | |
| | | | | P4 | 9.10 | | | | | | |
| | | | | P5 | 4.85 | 4.84 | | 2.758 | | | |
| | | | | P6 | 4.83 | | | | | | |
| | | | | P7 | 9.18 | | | | | | |
| | | | | P8 | 29.95 | | | | | | |
| | | | | P9 | 34.29 | 38.05 | | 3.226 | | | |
| | | | | P10 | 41.80 | | | | | | |

As shown in Table 3B, also in Example 13 to 15 in which $H_c/H_e$ is 48% or less or $d_c/d_e$ is 98% or less, swelling of the outer diameter of the battery case is suppressed as compared with Comparative Examples 1 to 2 in Table 1C, 0% batteries had a rupture in a body portion of the battery cases.

In an alkaline dry battery of the present invention, capacity can be increased, and an increase in an outer diameter of a battery can be suppressed. Therefore, the alkaline dry battery can be suitably used as a power supply of electric devices such as portable devices.

The invention claimed is:

1. An alkaline dry battery comprising:
 a bottomed cylindrical battery case;
 a positive electrode packed in the battery case and including n pieces of hollow cylindrical pellets;
 a negative electrode disposed in a hollow portion of the pellets;
 a separator interposed between the positive electrode and the negative electrode; and
 an alkaline electrolytic solution,
 wherein the positive electrode includes manganese dioxide and a conductive agent,
 n is an integer of 1 or more,
 an average density of manganese dioxide in the positive electrode is 2.80 to 3.00 g/cm$^3$, and
 a density $d_c$ of manganese dioxide in a center portion in a height direction of the positive electrode is 98% or less of an average value $d_e$ of densities of manganese dioxide in both end portions in the height direction of the positive electrode,
 wherein a distribution state of the density of manganese dioxide of each piece of the hollow cylindrical pellets is nonuniform in the height direction of the positive electrode.

2. The alkaline dry battery according to claim 1, wherein the density $d_c$ is 75% or more of the average value of densities $d_e$.

3. The alkaline dry battery according to claim 1, wherein a thickness of a body portion of the battery case is 0.08 to 0.20 mm.

4. The alkaline dry battery according to claim 1, wherein n is an integer of 1 to 8.

5. An alkaline dry battery comprising:
 a bottomed cylindrical battery case;
 a positive electrode packed in the battery case and including n pieces of hollow cylindrical pellets;
 a negative electrode disposed in a hollow portion of the pellets;
 a separator interposed between the positive electrode and the negative electrode; and
 an alkaline electrolytic solution,
 wherein the positive electrode includes manganese dioxide and a conductive agent,
 n is an integer of 1 or more,
 an average density of manganese dioxide in the positive electrode is 2.80 to 3.00 g/cm$^3$, and
 surface hardness $H_c$ of the positive electrode in a center portion in a height direction of the positive electrode is 48% or less of an average value $H_e$ of surface hardnesses of the positive electrode in both end portions in the height direction of the positive electrode,
 wherein a distribution state of the density of manganese dioxide of each piece of the hollow cylindrical pellets is nonuniform in the height direction of the positive electrode.

6. The alkaline dry battery according to claim 5, wherein the surface hardness $H_c$ is 7% or more of the average value $H_e$ of the surface hardnesses.

7. The alkaline dry battery according to claim 5, wherein a thickness of a body portion of the battery case is 0.08 to 0.20 mm.

8. The alkaline dry battery according to claim 5, wherein n is an integer of 1 to 8.

* * * * *